United States Patent [19]

Osborn

[11] 4,328,712
[45] May 11, 1982

[54] LOCKOUT FOR GIMBAL-TYPE AUTOMOTIVE TRANSMISSION GEAR SHIFTER

[75] Inventor: Charles Osborn, Spring Lake, Mich.

[73] Assignee: JSJ Corporation, Grand Haven, Mich.

[21] Appl. No.: 115,126

[22] Filed: Jan. 24, 1980

[51] Int. Cl.³ .................. F16H 57/06; G05G 9/16
[52] U.S. Cl. .................... 74/476; 74/473 R; 74/475; 74/538
[58] Field of Search ............ 74/473 R, 475, 476, 74/538

[56] References Cited

U.S. PATENT DOCUMENTS

| | | | |
|---|---|---|---|
| 1,888,728 | 11/1932 | Johnson | 74/476 |
| 1,914,678 | 6/1933 | Starkey | |
| 2,269,970 | 1/1942 | Bundy et al. | 74/484 |
| 3,216,274 | 11/1965 | Hurst, Jr. | 74/476 |
| 3,406,588 | 10/1968 | Hobbins | 74/476 |
| 3,527,115 | 9/1970 | Muhleck | 74/476 |
| 3,559,501 | 2/1971 | Wieland | 74/476 |
| 3,597,992 | 8/1971 | Lowry et al. | 74/476 |
| 3,648,536 | 3/1972 | Maina | 74/476 |
| 3,774,469 | 11/1973 | Bruhn, Jr. | 74/476 |
| 3,779,096 | 12/1973 | Hurst | 74/476 |
| 3,786,690 | 1/1974 | Bruhn, Jr. | 74/476 |
| 3,815,436 | 6/1974 | Morimoto et al. | 74/476 |
| 3,974,711 | 8/1976 | Hurst, Jr. et al. | 74/476 X |
| 3,998,110 | 12/1976 | O'Brien et al. | 74/476 |
| 4,018,099 | 4/1977 | O'Brien et al. | 74/476 X |
| 4,143,560 | 3/1979 | Kinkade et al. | 74/476 X |

*Primary Examiner*—Allan D. Herrmann
*Attorney, Agent, or Firm*—Price, Heneveld, Huizenga & Cooper

[57] ABSTRACT

A gimbal-type automotive transmission shifter and gear lockout is provided comprising a gear selecting shift lever; a pivotable shift lever carrier; and a stationary base for mounting the transmission shifter in an automotive vehicle. The shift lever and shift lever carrier are pivotable about first and second generally orthogonal axes, respectively. The shift lever is pivotable relative to the carrier about the first axis and the carrier is pivotable relative to the base about a second axis. Appropriate linkage is provided for translating these pivotable movements to the transmission for selecting a desired transmission drive ratio. A gear lockout is provided by a first gate disposed on the base. A detent is mounted for reciprocal movement with respect to the base. Biasing means is provided for biasing the detent into engagement with the base. The biasing means thereby prevents entry of the detent into the first gate and thus provides a positive first lockout for at least one gear position. Means for manually actuating the detent comprising a pushbutton or pull ring-type lockout actuator is provided for overcoming the biasing means and aligning the detent with the first gate to provide for entry into the locked out gear.

19 Claims, 16 Drawing Figures

LOCKOUT FOR GIMBAL-TYPE AUTOMOTIVE TRANSMISSION GEAR SHIFTER

BACKGROUND OF THE INVENTION

The invention relates generally to manual transmission gear shifter lockouts. More particularly, the invention is directed to manually actuated gear lockouts for a gimbal-type automotive manual transmission shifter.

The present application is related to U.S. Patent application Ser. No. 905,123 filed May 12, 1978, now U.S. Pat. No. 4,245,521 and entitled MANUAL TRANSMISSION SHIFTER FOR OPERATING A TRANSMISSION WITH FLEXIBLE CABLES. The disclosure of the aforementioned patent application is hereby incorporated by reference. Gimbal-type automotive manual transmission shifters are known and the aforementioned parent application relates to a gimbal-type manual transmission shifter for shifting an automotive transmission with a pair of flexible shielded cables known in the art as Bowden cables.

Prior art gimbal-type manual transmission shifters have been provided with a plurality of displaceable gear actuators mounted in a support housing. A pivotable gear selecting shift lever is mounted on a shift lever carrier that is pivotally mounted on the support housing. The shift lever carrier includes actuator engaging means and the shift lever is pivotally mounted about a first axis on the carrier for selectively engaging one of the displaceable gear actuators. The carrier is pivotally mounted about a second axis for selectively displacing the gear actuator chosen by pivoting of the gear selecting shift lever about the first axis. This type of shifter may be provided with a reverse gear lockout comprising a gate plate disposed between the foreword gear actuators and the reverse gear actuator. In this case the gear selecting shift lever is both pivotable and vertically adjustable. The actuator for the reverse gear is disposed behind the gate plate at a level higher than the forward gear actuators. Thus, to engage the reverse gear actuator in this type of reverse gear lockout, the gear selecting shift lever must be simultaneously lifted and aligned with the gate in the gate plate before it can be pivoted into engagement with the reverse gear actuator disposed behind the gate plate.

Generally, gimbal-type automotive manual transmission shifters are preferred to other types of manual transmission shifters since they are mechanically precise and provide the operator with a shifter having a good "feel". However, gimbal shifters of the type having a plurality of displaceable gear actuators must be mounted directly to the transmission or directly adjacent thereto so that the displaceable gear actuators may be directly connected to the shift linkage extending from the shifting dogs in the transmission. Therefore, such a shifter is unsuitable for use in vehicle configurations where the transmission is not disposed immediately adjacent the operator's seat in the vehicle. For example, such a transmission shifter is unsuitable for use in front engine, front wheel drive cars and in rear engine, or mid-engine rearwheel driven cars where the transmission is disposed to the front and rear, respectively, of the operator.

Various other types of reverse lockout mechanisms have been provided with transmission mounted shifters other than the gimbal-type. In one type of reverse gear lockout, biasing means is provided to normally bias the gear selecting shift lever away from the reverse gear actuating position. Thus, to shift into reverse with this type of lockout, a force substantially greater than normal gear shifting force is required to overcome this lockout bias.

Still other types of reverse gear lockout mechanisms used with transmission mounted non-gimbal type shifters employ a so-called positive lock comprising a mechanical stop or the like which may be removed only by some action independent from the normal shifting action of the gear selecting shift lever. For example, with such a lockout, reverse gear may only be entered by actuating a separate reverse gear lockout lever that is independent from the principal gear selecting shift lever. This type of reverse gear lockout is generally referred to as a positive mechanical lock. Of these prior art positive lock reverse lockout mechanisms, those employing a pushbotton release or pull-ring release disposed on the handle of the gear selecting shift lever are most desirable. The advantages of this type of reverse lockout mechanism center about operator convenience and aesthetic reasons.

SUMMARY OF THE INVENTION

According to the present invention, a cable operating gimbal-type automotive transmission shifter is provided having a pushbutton or pull-ring actuated positive mechanical lockout. The shifter and gear lockout comprise a pivotable gear selecting shift lever and a pivotable shift lever carrier. The shift lever is pivotably mounted about a first axis on the carrier. A stationary base is provided which is adapted for mounting the shifter to an automotive vehicle. The shift lever carrier is pivotably mounted about a second axis on the base. The first and second axes are generally orthogonal. A first gate is disposed on the base and a detent is mounted for reciprocal movement with respect to the base. Biasing means is provided for biasing the detent into engagement with the base. This biasing means prevents entry of the detent into the first gate and thus provides a positive first lockout for at least one gear position of the shifter. Means are provided on the shift lever for manually actuating the detent and aligning the same with the first gate to provide for actuation of the locked out gear. The pivotable shift lever and shift lever carrier provides for simplified assembly, cost reduction and reliability in a compact H pattern shifter having a solid mechanical feel. The reciprocating lockout detent may be actuated by a pushbutton or pull ring type mechanical actuator disposed atop the pivotable shift lever to provide operator convenience and a pleasing aesthetic appearance. The first gate may be employed as a reverse gear lockout in the case of a conventional four speed transmission having an H shift pattern. Other gates may be provided to provide lockouts for other gear ranges. For example, a second gate may be provided to provide a fifth gear or overdrive gear lockout.

DESCRIPTION OF THE PREFERRED EMBODIMENTS

Figures 1, 7:
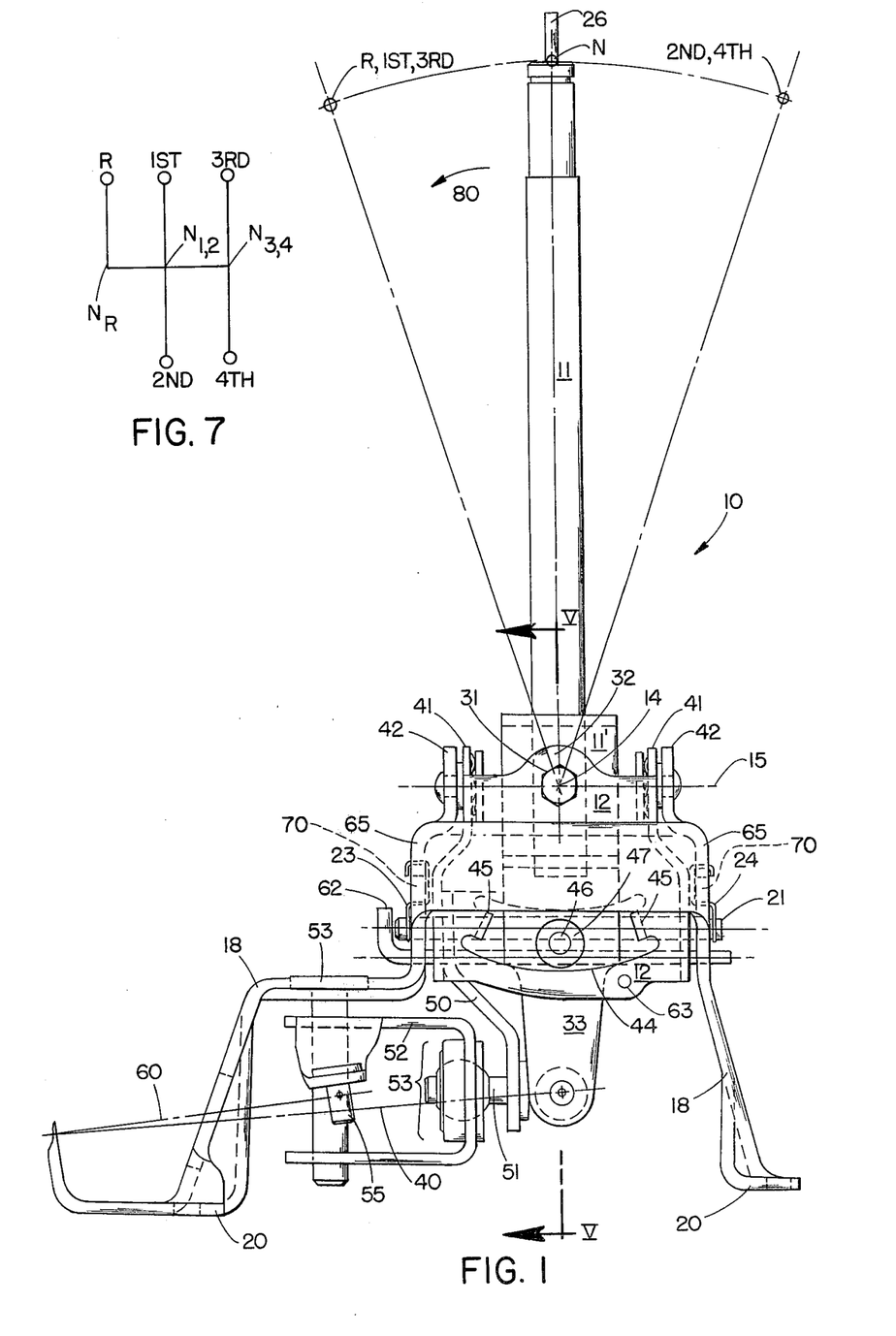
FIG. 1 is a side elevational view of a shifter and gear lockout constructed according to the present invention.
FIG. 7 illustrates the shifting pattern of a four speed shifter constructed according to the present invention.
Figures 2, 4, 12:
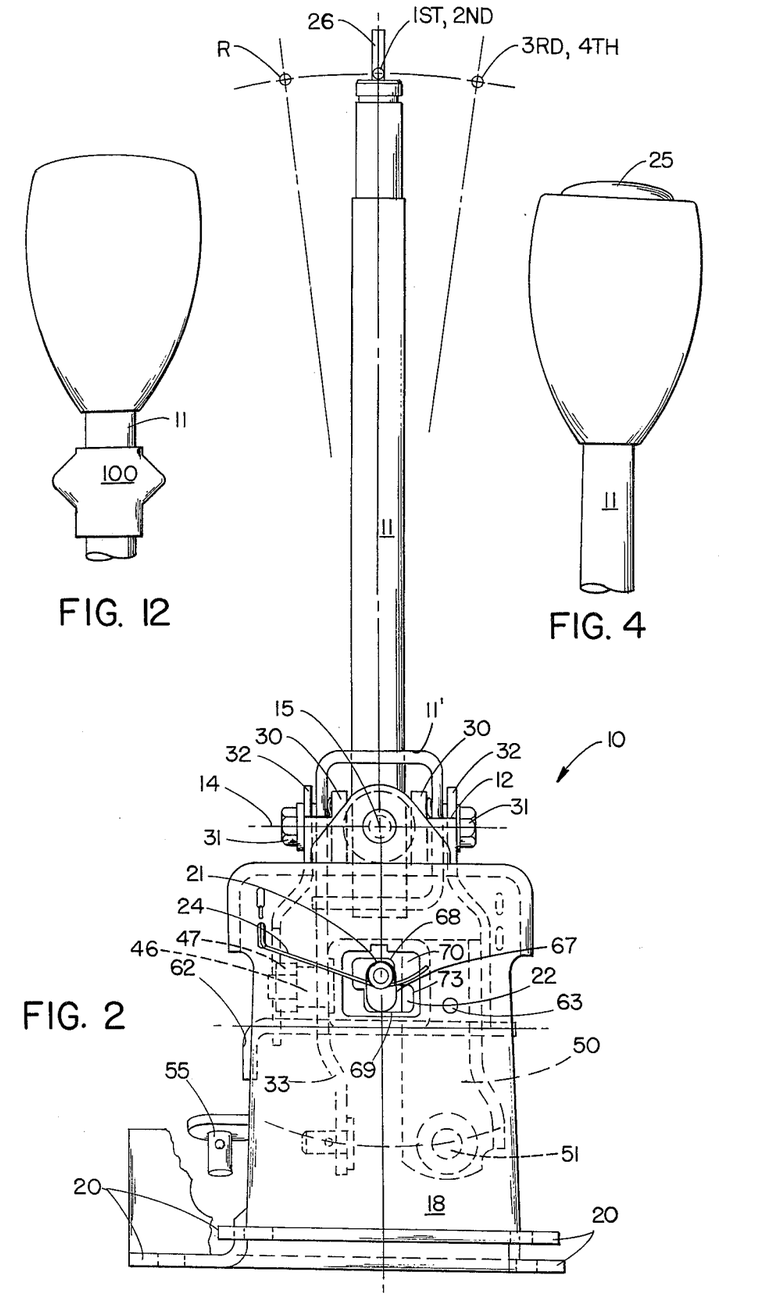
FIG. 2 is a rear view of the shifter and gear lockout of FIG. 1.
FIG. 4 is a partial view of a shift lever and pushbutton lockout actuator constructed according to the present invention.
FIG. 12 is a partial view of a shift lever constructed according to the present invention having a pull ring type of lockout actuator.
Figure 3:
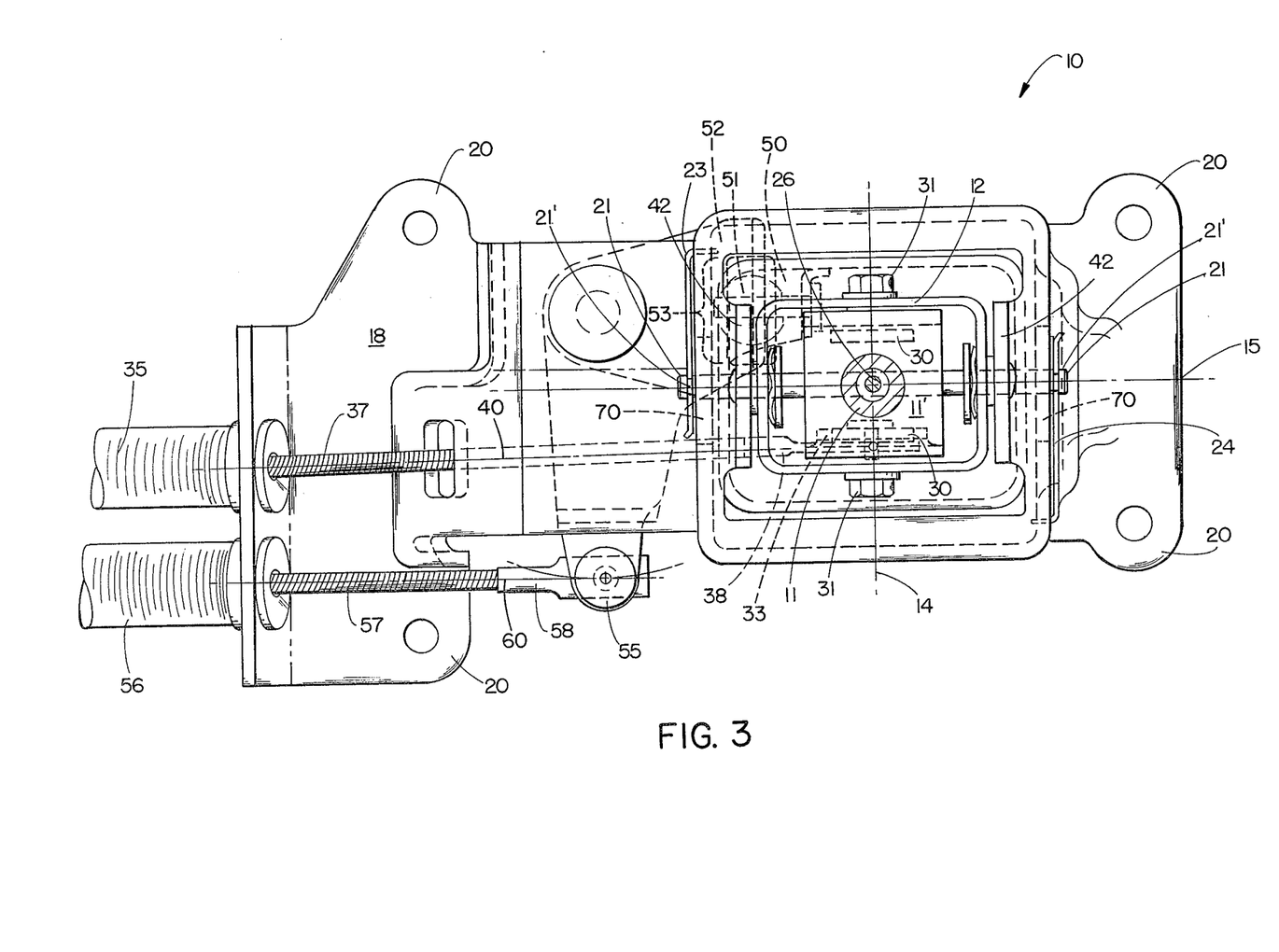
FIG. 3 is a plan view of the shifter and gear lockout of FIG. 1.

Referring to FIGS. 1, 2 and 3, a cable operating floor-mounted, four speed, gimbal-type automotive transmission shifter and reverse gear lockout 10 is illustrated. The shifter comprises a pivotable gear selecting shift lever 11 and a pivotable shift lever carrier 12. The shift lever 11 is pivotable about a first axis 14. The shift lever carrier 12 is pivotable about a second axis 15. The first and second axes 14 and 15 are generally orthogonal. A stationary base 18 is provided for mounting the transmission shifter in an automotive vehicle. The base 18 is provided with apertured flanges 20 for suitably mounting the base to the floor pan of an automotive vehicle with a plurality of bolts, rivets or other suitable fasteners. A detent 21 is mounted for reciprocal movement with respect to the base 18. A first gate 22 illustrated in FIG. 2 is disposed on the base. Biasing means comprising a plurality of cantilevered springs 23 and 24 are provided for biasing the detent 21 into engagement with the base. In this case, the biasing means biases the detent 21 upwardly away from the gate 22, thereby preventing entry of the detent 21 into the first gate 22 and providing a positive first lockout for at least one gear position.

In the embodiment of FIGS. 1, 2 and 3, since the detent 21 is spring biased in the upward direction, means for manually actuating the detent 21 and aligning the same with the first gate 22 is provided comprising a pushbutton 25, illustrated in FIG. 4, disposed atop the shift lever handle 11. The pushbutton 25 is interconnected with the detent 21 by an actuator rod 26 which extends through the length of tubular shift lever handle 11.

Figure 5:
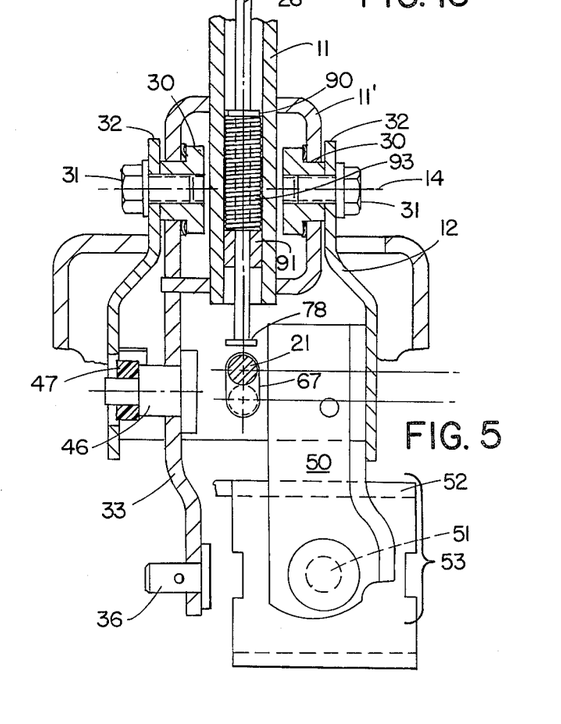
FIG. 5 is a partial cross-sectional view of the shifter and lockout of the present invention taken along line V—V in FIG. 1.

Referring now also to FIG. 5, it is illustrated that the tubular shift lever handle 11 is welded or otherwise suitably secured to a box-like structure 11'. Opposing sides of the box-like structure 11' are journaled on bushings 30 which threadably receives bolts 31 extending through flanges 32 disposed on opposing sides of the carrier 12, to pivotally mount the shift lever thereto about the first axis 14. The box-like structure 11' includes an actuator arm 33 extending below the first axis 14 for translating pivotal motion of the shift lever 11 about the first axis 14 into a first cable displacement. A first flexible shielded cable or Bowden cable 35, illustrated in FIG. 3, is connected to the actuator arm 33 by a pin 36 that is welded or otherwise suitably secured to the actuator arm 33. More specifically, the inner flexible cable 37 of the Bowden cable 35 is provided with an apertured lug 38 that encompasses pin 37. In FIG. 1, the central axis of the flexible cable 37 is normally disposed along the line 40. The lug 38 is free to pivot about pin 36, thus preventing a bending moment from being imparted to the cable 37 when the shift lever 11 is pivoted about the first axis 14.

As best illustrated in FIG. 1 opposing sides 41 of the shift lever carrier 12 are similarly mounted to opposing flanges 42 of the base 18 to provide for the pivotal motion of the carrier 12 about the second axis 15. The body of the carrier 12 includes an arcuate slot 44 having stops 45 formed on opposing sides thereof. The actuator arm 33 of the shift lever 11 includes a second pin 46 welded or otherwise suitably secured to the arm 33 and extending through the arcuate slot 44. The second pin 46 includes an elastomer bumper 47 that is arcuately displaced in the slot 44 by pivotal motion of the shift lever 11 about the first axis 14. Engagement of the stops 45 on opposite ends of arcuate slot 44 by the elastomer bumper 47 define limits on the arcuate path of travel of the shift lever 11 about the first axis 14 without undesirable metal to metal contact.

The carrier 12 includes an actuator arm 50 welded or otherwise suitably secured thereto for pivotal movement with the carrier about the second axis 15. The carrier actuator arm 50 includes a drive pin 51 disposed below the second axis 15 for transmitting the arcuate motion of the carrier actuator arm to a bell crank 52 pivotally mounted by weld pin 53 to the stationary base 18. The drive pin 51 is connected to bell crank 52 by a ball and socket 53 which accommodates the arcuate motion of drive pin 51. The bell crank 52 includes a pin 55 welded or otherwise suitably secured thereto for translating the pivotal motion of the bell crank 52 into a second cable displacement. The second flexible shielded cable 56 illustrated in FIG. 3 includes an inner cable 57 having an apertured lug 58 that is secured to the pin 55 in a manner similar to that previously described with regard to the first cable 35. In FIG. 1 the central axis of the inner cable 57 of the flexible shielded cable 55 is normally disposed along the line 60.

Pins 62 illustrated in FIGS. 1 and 2 extend through apertures 63 disposed in the carrier 12 and base 18 for fixing the pivotable shift lever 11 and carrier 12 in preset positions during shipment. Preferably the shift lever 11 and carrier 12 are preset at predetermined positions which facilitate attachment of the first and second flexible shielded cables 35 and 56.

Figure 6:
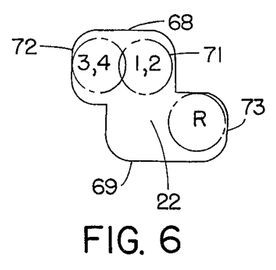
FIG. 6 illustrates a slot configuration and the detent positions for four forward speed transmission with a pushbutton actuated reverse gear lockout.

As best illustrated in FIGS. 1 and 3, preferably, the detent 21 mounted for reciprocal movement relative to the base 18 comprises a shaft extending through opposing sides 65 of the base 18. The ends of the detent shaft 21 preferably include circumferential grooves 21', best illustrated in FIG. 3, which are engaged by the cantilevered springs 23 and 24. The detent shaft 21 moves in an arcuate path of travel defined by the pivotal motion of the shift lever 11 and carrier 12 about second axis 15. As best illustrated in FIG. 5, reciprocal movement of the detent shaft 21 is accommodated by mounting the shaft 21 in vertically oriented slots, such as the slot 67 disposed in carrier 12. Opposing ends of the detent shaft 21 extend further through first slots 68 disposed in opposing sides 65 of stationary base 18. Preferably, the first slot 68 and gate 22 are disposed in plastic inserts 70 suitably mounted in opposing sides 65 of the stationary base 18. Interference between the detent shaft 21 and opposing sides of the first slots 68 define the limits of the pivotal motion of the shift lever 11 and carrier 12 about the second axis 15. In the present embodiment, an H pattern four forward speed manual transmission having a pushbutton actuated reverse gear lockout is illustrated and thus the gate 22 is disposed below the first slot 68 which normally defines the arcuate limits of travel of the shift lever 11 between forward gear positions. As best illustrated in FIG. 6, preferably the gate 22 comprises a second interconnecting slot 69. With reference also to FIG. 7 interference between opposing ends 71 and 72 of the first or upper slot 68 and the detent shaft 21 defines the $N_{1,2}$ and $N_{2,3}$ positions when the shift lever is pivoted about the second axis 15. The second slot or lower slot 69 interconnects with the first slot 68 to define the gate 22 heretofore referred to. The second slot 69 defines an extended arcuate path of travel for the detent shaft 21 required to pivot the shift lever 11 and carrier 12 about the second axis 15 to $N_R$ and the reverse gear position R. Interference between the end 73 of the second slot 69 and the detent shaft 21 defines $N_R$ and the reverse gear position R.

Reciprocal motion of the detent shaft 21 between the first and second slots 68 and 69 is provided for by the manually actuated pushbutton 25 disposed atop the shift lever 11. As best illustrated in FIG. 5, an actuator rod 26 interconnects the pushbutton 25 disposed atop the shift lever 11 and the detent shaft 21. The detent shaft 21 includes a follower or foot 78 disposed on the end of the detent shaft 26. The follower or foot 78 engages the detent shaft 21 when pushbutton 25 is depressed with a force sufficient to overcome the upward biasing force provided by compression mounted coil spring 93. Thus, when the shift lever 11 is disposed in the $N_{1,2}$ position, application of sufficient downward force on pushbutton 25 shifts the detent shaft 21 into the lower or second slot 69 defining the gate 22 to provide for the extended arcuate path of travel of the shift lever 11 and carrier 12 about the second axis 15 and necessary for entry of the shifter into the reverse gear position R.

With reference to FIG. 7 illustrating the shift pattern of the present embodiment of the invention, the operation of the shifter and lockout of the present invention will be described in further detail. In FIG. 1, the arrow 80 indicates the forward direction of the vehicle. In FIGS. 1, 2 and 3 the shift lever 11 is illlustrated in the neutral position $N_{1,2}$ between the 1st and 2nd forward gears. To place the shifter in the 1st gear position the operator pivots the shift lever 11 forward toward the 1st gear position from the $N_{1,2}$ position. Pivoting of the shift lever 11 to the 1st gear position is accommodated by rotation of the shift lever 11 about the first axis 14. Movement of the shift lever 11 toward the 1st gear position is translated into a displacement of the inner cable 37 of the first flexible shielded cable by virtue of the fact that the inner cable 37 is directly pinned to actuator arm 33 extending therefrom. Movement to the 2nd gear position is accomplished by pivoting of the shift lever 11 about the first axis 14 rearward in the opposite direction. Again, this motion is translated into a displacement of the first cable 35 by actuator arm 33. To move the shifter to the 3rd gear position, the operator pivots the shift lever 11 forward about the first axis 14 until the neutral position $N_{1,2}$ is reached, then pivots the shift lever 11 to his right about the second orthogonal axis 15 until reaching the $N_{3,4}$ position and then pivots the shift lever forward about the first axis 14 until the 3rd gear position is reached. Pivotal movement of the shift lever 11 about the second orthogonal axis 15 is accommodated by pivotal movement of the carrier 12 with respect to the base 18. This pivotal movement of the base 12 displaces the inner cable 57 of the flexible shielded cable 56 connected to bell crank 52 interconnecting the cable 56 and drive pin 51 of carrier 12. Again, pivotol movement of the shift lever 11 about the first axis 14 is translated into a displacement of the first cable 35 by virtue of the fact that the inner cable 37 of the first cable 35 is directly pinned to actuator arm 33 of the shift lever 11. The transmission is shifted to the 4th gear position when the operator pivots the shift lever 11 about the first axis 14 rearward to the 4th gear position. Interference between the detent shaft 21 and opposing ends of the first slot 68 define the $N_{1,2}$ and $N_{3,4}$ positions when the shift lever and carrier 12 are pivoted about the second axis 15. To enter the reverse gear position R the operator returns the shift lever to the $N_{1,2}$ position and depresses the pushbutton 25 disposed atop the shift lever handle 11. Application of sufficient force to overcome the spring biasing force of leaf springs 21 and 22 and coil spring 93 causes the foot 78 of the pushrod 26 to engage the detent shaft 21 and displace the same downwardly through the gate 22 formed by the second slot 69 disposed below the first slot 68. The second slot 69 defining the gate 22 provides for an extension of the arcuate path of travel of the shift lever 11 and carrier 12 about second axis 15 allowing entry to the reverse gear position R. Interference between the detent shaft 21 and the end 73 of the second slot 69 define a stop for pivotal motion of the shift lever 11 and carrier 12 about the second axis 15 at $N_R$ in the shift pattern illustrated in FIG. 7. Thereafter, the operator completes entry into the reverse gear position R by pivotally moving the shift lever 11 about the first axis 14 forward to the reverse gear position.

Figures 8, 9:
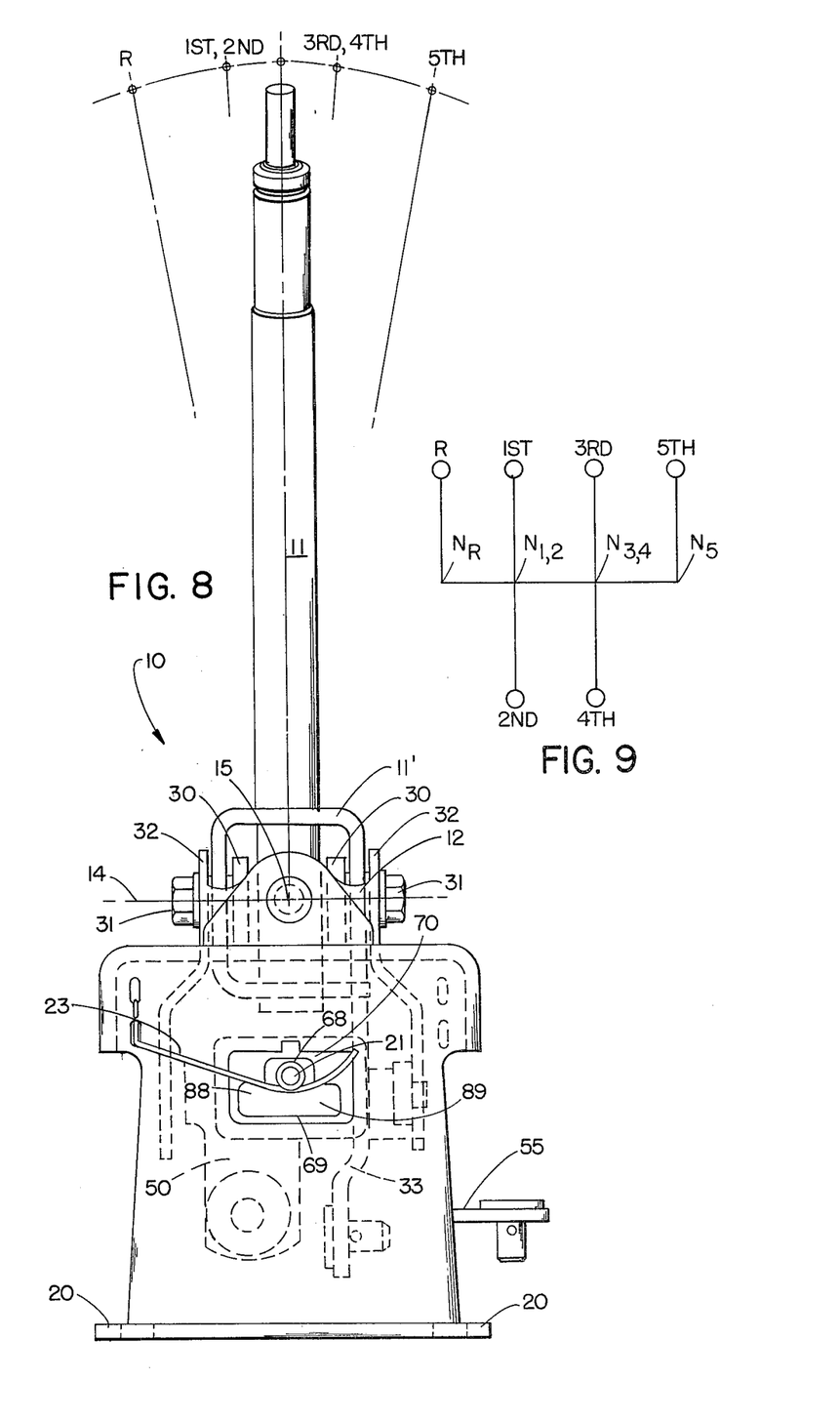
FIG. 8 is a front view of a shifter and lockout constructed according to the present invention having five forward gears and both reverse gear and fifth gear lockouts.
FIG. 9 illustrates the shifting pattern of the shifter of FIG. 8.
Figure 10:
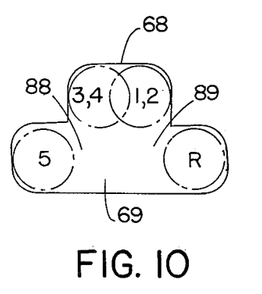
FIG. 10 illustrates a rear view of a slot configuration and the detent positions for a five speed transmission with both reverse gear and fifth gear pushbutton actuated lockouts.
Figure 11:
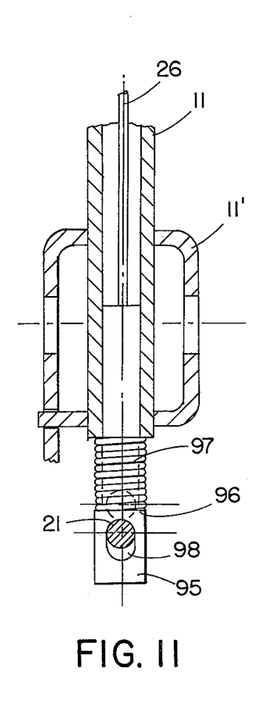
FIG. 11 is a partial sectional view of an actuator rod and detent shaft lifting member constructed according to the present invention for providing a lift ring or pull ring type of lockout actuator.

Forming the first and second slots 68 and 69 in plastic inserts 70 detachably mounted in the base 18 eliminates metal to metal contact and provides the ability to create a variety of shift patterns and lockouts arrangements. For example, by extending the second slot 69 as illustrated in FIGS. 8 and 10, a pair of gates 88 and 89 may be provided for effecting both a reverse gear and a 5th gear lockout, respectively. FIG. 9 illustrates the shift pattern of such a shifter. The shifter illustrated in FIG. 8 is in all regards like that illustrated in FIGS. 1 through 5 except that plastic inserts 70 are provided with a pair of slots 68 and 69 altering the shift pattern of the shifter. Like components are given the same numeral designation and with one exception the operation of the shifter illustrated in FIG. 8 is identical to that of the shifter previously illustrated. The one exception is that when the operator wishes to enter the 5th gear or overdrive position, the shift lever 11 is pivoted to the $N_{3,4}$ position and the pushbutton 25 disposed atop the shift lever 11 is depressed to allow entry of the reciprocal detent shaft 21 into the second gate 89. Further pivotal movement of the shift lever 11 about the second axis 15 allows the operator to reach the $N_5$ position where pivotal movement of the shift lever 11 forward about the first axis 14 allows the operator to enter the 5th gear or overdrive gear position. Thus, it is possible to achieve various multi-speed manual transmission shifters having a variable number of locked out gears by varying the position and shape of the slots disposed in plastic inserts 70.

Furthermore, in other embodiments of the invention, a pull ring actuated lockout may be provided. As illustrated in FIG. 5, in the case of a pushbutton reverse gear lockout, the actuator rod 26 includes a shoulder 90 and the tubular shift lever handle includes a plug 91 having a coil-type compression spring 93 mounted therebetween. This effectively biases the pushbutton 25 disposed atop the shift lever 11 in the upward position. With comparison of FIG. 5 to FIG. 11, it is illustrated that to form a pull ring type lockout actuator, the actuator rod 26 is provided with a shaft lifting member 95 disposed on the end of the actuator rod 26. The shaft lifting member 95 includes a shoulder 96 and a coil spring 97 compression mounted between the tubular shift lever handle 11 and the shoulder 96 of the shaft lifting member 95. This effectively spring biases the actuator rod 26 in the downward direction. The shaft lifting member 95 includes a slot 98 that normally encompasses the detent shaft 21 for lifting the same. A slot 98 is provided to encompass the detent shaft 21 since when the shift lever 11 is pivoted about the first axis 14, some displacement of the shaft lifting member 98 and the detent shaft 21 must be tolerated due to the arcuate motion of the shift lever. In this case, as illustrated in FIG. 12, the shift lever handle 11 is provided with a pull ring or the like at 100 for manually actuating the actuator rod 26 upward against the spring biasing force provided by the compression mounted coil spring 97. In this embodiment, it is also necessary to reverse the spring biasing force applied by the leaf springs 23 and 24, so that the detent shaft 21 is spring biased downwardly.

Figure 13:
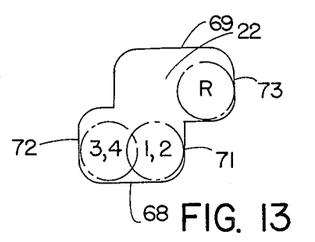
FIG. 13 illustrates a slot configuration and the detent positions for a four speed shifter constructed according to the present invention with a pull ring actuated reverse gear lockout.
Figure 14:
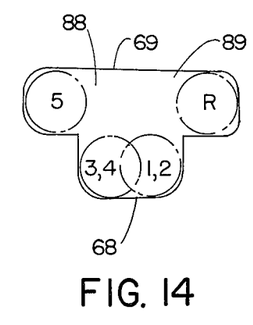
FIG. 14 illustrates a slot configuration and the detent positions for a five speed shifter and lockout constructed according to the present invention having pull ring actuated reverse gear and fifth gear lockouts.
Figure 15:
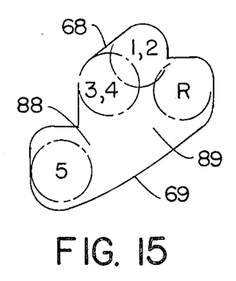
FIG. 15 illustrates a slot configuration and the detent positions for a five speed shifter having both reverse and fifth gear lockouts actuated by unequal displacements of a pushbutton type actuator.

Configurations for the first and second slots defining a shifter having the same functions previously described with the exception that a pull ring type lockout actuator is provided rather than a pushbutton type lockout actuator, are identical to the configurations previously disclosed except that the first and second slots are reversed with the second slot being disposed above the first slot. For example, FIGS. 13 and 14 illustrate the correct configurations for a four speed shifter with reverse gear lockout and a five speed shifter with both reverse and fifth gear lockouts, respectively. Again, like components are given the same numeral designations. It should also be realized that the second slot defining the reverse gear and 5th gear or overdrive gear lockouts may be provided with first and second gates separated by unequal distances from the first slot so that the pushbutton or pull ring type actuator used must be displaced unequal amounts to enter the reverse and overdrive gear positions. Such a configuration is indeed illustrated in FIG. 15 for a shifter having a pushbutton actuated reverse gear and overdrive gear lockout. In FIG. 15 the first and second slots 68 and 69 are generally arcuate in shape and the gates 88 and 89 defined by the arcuate second slot 69 are displaced an unequal amount with respect to the first slot 68.

Figure 16:
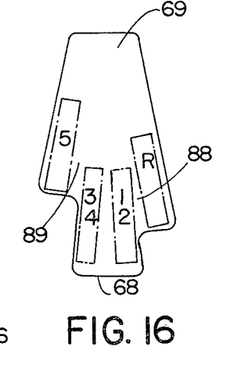
FIG. 16 illustrates a slot configuration and the detent positions for a five speed transmission having pull ring actuated reverse gear and fifth gear lockouts requiring an unequal amount of pull ring displacement for entry into the locked out gears, the detent shaft in this case having a rectangular cross section.

In all of the embodiments heretofore presented, a detent shaft 21 having a circular cross section is illustrated. However, it is to be understood that as a cost savings measure, a rectangular stamped or extruded detent shaft may be provided. Referring to FIG. 16 in the case where a detent shaft having a rectangular cross section is provided, the slot configuration for a five speed pull ring actuated gear shifter having both reverse and 5th gear pull ring actuated lockouts is illustrated. In FIG. 16 the 5th gear and reverse gear positions are defined by gates 88 and 89, respectively, in the second slot 69, that are separated unequal distances from the first slot 68 to provide reverse and 5th gear lockouts requiring an unequal displacement of the pull ring actuator.

The above description should be considered as exemplary and that of the preferred embodiment only. The true spirit and scope of the present invention should be determined by reference to the appended claims. It is desired to include within the appended claims all modifications of the invention that come within the proper scope of the invention.

The embodiments of the invention in which an exclusive property or privilege is claimed are defined as follows.

1. A cable operating gimbal-type automotive transmission shifter and gear lockout comprising:
   a pivotable gear selecting shift lever;
   a pivotable shift lever carrier;
   first and second generally orthogonal axes;
   a base adapted for mounting the transmission shifter in an automotive vehicle;
   said shift lever being pivotable relative to said carrier about said first axis;
   said carrier being pivotable relative to said base about said second axis;
   a first gate disposed on said base;
   a detent mounted for reciprocal movement relative to said base;
   biasing means for biasing said detent into engagement with said base, said biasing means preventing entry of said detent into said first gate and thus providing a positive first lockout for at least one gear position; and
   means for manually actuating said detent and aligning the same with said first gate to provide for entry to the locked-out gear.

2. The cable operating gimbal-type automotive transmission shifter and gear lockout of claim 1 wherein said first gate is provided for locking out one of an overdrive gear and a reverse gear.

3. The cable operating gimbal-type automotive transmission shifter and gear lockout of claim 1 further including a second gate disposed on said base, said first gate providing a reverse gear lockout and said second gate providing an overdrive gear lockout.

4. The cable operating gimbal-type automotive transmission shifter and gear lockout of claims 2 or 3 wherein said detent is biased downwardly and said means for manually actuating said detent comprsises a pull ring-type lockout actuator.

5. The cable operating gimbal-type automotive transmission shifter and gear lockout of claims 2 or 3 wherein said detent is biased upwardly and said means for manually actuating said detent comprises a pushbutton-type lockout actuator.

6. The cable operating gimbal-type automotive transmission shifter and gear lockout of claim 1 wherein said base includes first and second opposing sidewalls and said detent comprises a shaft extending through said first and second opposing sidewalls of said base.

7. The cable operating gimbal-type automotive transmission shifter and gear lockout of claim 6 wherein said shaft is provided with a circular cross section.

8. The cable operating gimbal-type automotive transmission shifter and gear lockout of claim 6 wherein said shaft is provided with a rectangular cross section.

9. The cable operating gimbal-type automotive transmission shifter and gear lockout of claim 6 wherein said shaft is provided with first and second ends, said first and second ends of said shaft extending through said first and second sidewalls of said base, respectively, and said biasing means comprises first and second spring members cantilevered on said base and engaging said first and second ends of said shaft, respectively.

10. The cable operating gimbal-type automotive transmission shifter and gear lockout of claim 6 wherein said shaft is biased downwardly and said shift lever is provided with a tubular portion having a shift lever handle disposed atop said tubular portion, said means for manually actuating said detent and aligning the same with said first gate comprising a lift ring disposed on said shift lever below said handle, an actuator rod extending through said tubular portion of said shift lever, said actuator rod being connected to said lift ring and a shaft lifting member engaging said shaft, said shaft lifting member being disposed on said actuator rod.

11. The cable operating gimbal-type automotive transmission shifter and gear lockout of claim 10 further including a compression loaded coil spring mounted between said shaft lifting member and said tubular portion of said shift lever, said coil spring being disposed about said actuator rod.

12. The cable operating gimbal-type automotive transmission shifter and gear lockout of claim 6 wherein said shaft is biased upwardly and said shift lever is provided with a tubular portion having a shift lever handle disposed atop said tubular portion, said means for manually actuating said detent and aligning the same with said first gate comprising a pushbutton disposed atop said handle, an actuator rod extending through said tubular portion of said shift lever, said actuator rod engaging said push button and a detent follower engaging said detent, said detent follower being disposed on said actuator rod.

13. The cable operating gimbal-type automotive transmission shifter and gear lockout of claim 12 further including a plug disposed in said tubular portion of said shift lever, a shoulder disposed on said actuator rod above said plug and a compression loaded spring mounted therebetween, said spring being disposed about said actuator rod.

14. The cable operating gimbal-type automotive transmission shifter and gear lockout of claim 6 wherein said first and second sidewalls are each provided with a first slot and a second slot, said shaft extending therethrough, said first slot defining the arcuate path of travel of said shaft as said shift lever is pivoted between lower and upper gears, said second slot defining an extended arcuate path of travel for said shaft required to pivot said shift lever to one of an overdrive gear and a reverse gear position, said gate being defined by a connection between said first and second slots for transferring said shaft between said first and second slots.

15. The cable operating gimbal-type automotive transmission shifter and gear lockout of claim 14 wherein said second slot defines an extended arcuate path of travel for said shaft that in one direction defines a reverse gear position and in the other direction defines an overdrive gear position.

16. The cable operating gimbal-type automotive transmission shifter and gear lockout of claim 14 wherein said second slot includes a reverse gear position and an overdrive gear position, said reverse gear and overdrive gear positions being separated unequal distances from said first slot.

17. The cable operating gimbal-type automotive transmission shifter and gear lockout of claim 14 wherein said means for manually actuating comprises a pull ring-type lockout actuator and second second slot is disposed above said first slot with said gate being disposed therebetween.

18. The cable operating gimbal-type automotive transmission shifter of claim 14 wherein said means for manually actuating comprises a pushbutton-type lockout actuator and said second slot is disposed below said first slot with said gate being disposed therebetween.

19. The cable operating gimbal-type automotive transmission shifter of claim 14 wherein said first and second slots are disposed in plastic inserts mounted in said first and second sidewalls of said base.

* * * * *

UNITED STATES PATENT AND TRADEMARK OFFICE
CERTIFICATE OF CORRECTION

PATENT NO. : 4,328,712
DATED : May 11, 1982
INVENTOR(S) : Charles Osborn

It is certified that error appears in the above—identified patent and that said Letters Patent is hereby corrected as shown below:

The term of this patent subsequent to January 20, 1998 has been disclaimed.

Signed and Sealed this

Sixth Day of July 1982

[SEAL]

Attest:

Attesting Officer

GERALD J. MOSSINGHOFF

Commissioner of Patents and Trademarks